(12) United States Patent
Tashiro

(10) Patent No.: US 7,504,032 B2
(45) Date of Patent: Mar. 17, 2009

(54) FILTER DEVICE

(75) Inventor: Minoru Tashiro, Tokyo (JP)

(73) Assignee: Bunri Incorporation, Miyakonojo-shi (JP)

( * ) Notice: Subject to any disclaimer, the term of this patent is extended or adjusted under 35 U.S.C. 154(b) by 0 days.

(21) Appl. No.: 11/812,847

(22) Filed: Jun. 22, 2007

(65) Prior Publication Data

US 2008/0093285 A1    Apr. 24, 2008

Related U.S. Application Data

(63) Continuation of application No. PCT/JP2006/320664, filed on Oct. 17, 2006.

(30) Foreign Application Priority Data

Oct. 17, 2005    (JP)    ............... 2005-302067

(51) Int. Cl.
*B03C 1/02*    (2006.01)
(52) U.S. Cl. ............... 210/223; 210/222; 210/695
(58) Field of Classification Search ......... 210/222, 210/223, 695
See application file for complete search history.

(56) References Cited

U.S. PATENT DOCUMENTS 2,452,220 A * 10/1948 Bower ............... 210/222

2002/0195383 A1    12/2002    Caiozza

FOREIGN PATENT DOCUMENTS

| JP | 53-22272 | 8/1976 |
|---|---|---|
| JP | 4-281807 | 10/1992 |
| JP | 07-289813 | 11/1995 |
| JP | 08-257321 | 10/1996 |
| JP | 11-77479 | 3/1999 |
| JP | 2002-113470 | 4/2002 |
| JP | 2005-111453 | 4/2005 |
| JP | 2005-238066 | 9/2005 |

OTHER PUBLICATIONS

Search Report of Australian patent Office dated Dec. 20, 2007 regarding related Singapore Patent application.
Official Action dated Oct. 12, 2007 in Japanese Patent Application No. 2005-302067.

* cited by examiner

*Primary Examiner*—David A Reifsnyder
(74) *Attorney, Agent, or Firm*—Bacon & Thomas, PLLC (57) ABSTRACT

A filter device has a filter tank into which a contaminated fluid is introduced, a magnetic ball filter medium using a large number of metal balls, magnets, and lift rods. The magnetic ball filter medium is formed of an aggregate of a large number of spherical metal balls of a magnetic material and is held in a filter medium storage portion in a manner such that the metal balls are movable relatively to one another. The magnets are movable between a first position and a second position. When in the first position, the magnets apply a magnetic field to the metal balls, thereby causing the metal balls magnetically to attract one another and so that the metal balls are fixed to one another. When in the second position, the magnetic attraction between the metal balls is canceled so that the metal balls are movable.

5 Claims, 7 Drawing Sheets

FILTER DEVICE

CROSS-REFERENCE TO RELATED APPLICATIONS

This is a Continuation Application of PCT Application No. PCT/JP2006/320664, filed Oct. 17, 2006, which was published under PCT Article 21(2) in Japanese.

This application is based upon and claims the benefit of priority from prior Japanese Patent Application No. 2005-302067, filed Oct. 17, 2005, the entire contents of which are incorporated herein by reference.

BACKGROUND OF THE INVENTION

1. Field of the Invention

The present invention relates to a filter device for filtering a contaminated fluid that contains particles.

2. Description of the Related Art

In a machine tool for precision machining, for example, a fluid such as a coolant is used to lubricate or cool machined portions. Since particles of dust, carbon, etc., as well as chips, become mixed into the fluid as a workpiece is machined, a fluid of this type is gradually contaminated to a point at which it becomes unusable.

There has been proposed a filter device in which magnetic impurities in the contaminated fluid are captured by magnetizing, by means of a solenoid coil, chips as filter elements that are produced by the machine tool, for example, in order to filter the contaminated fluid. A conventional filter device is described in Jpn. Pat. Appln. KOKAI Publication No. 11-77479.

Since the conventional filter device described above uses the filter elements that are formed of chips, it is subject to a substantial dispersion in filtering accuracy. Besides, filterable particles are limited to metallic particles, such as chips of a magnetic material, so that the device cannot fulfill its filtering capacity for non-magnetic particles of carbon, aluminum, etc., especially ultra-fine particles of several tens of μm or thereabout.

If the filter elements that are formed of chips are used, moreover, it is hard to clean the filter elements to recover the filtering capacity when the filtering capacity is reduced, since the surfaces of the chips are very rough. Even though the filter elements (chips) themselves are not costly, therefore, these filter elements (chips) must be frequently changed, thus entailing labor and high cost.

BRIEF SUMMARY OF THE INVENTION

The surface of a filter medium should preferably be smooth enough to ensure efficient cleaning. In order to enhance the filtering performance, according to common sense, however, it has been supposed to be desirable to allow a large number of irregularities or pores to exist in the surface of the filter medium, so that a smooth-surface material has never been used as the filter medium. In other words, the filtering efficiency and the ease of cleaning have been considered to be incompatible. According to an eager study conducted by the inventor hereof, however, it was found that a high-performance filter device suited for precision filtering and capable of easy cleaning can be obtained by combining magnets with spherical magnetic metal balls that are formed of smooth-surface steel balls, as described in detail herein.

The object of the present invention is to provide a filter device capable of filtering non-magnetic particles as well as magnetic particles and of easy cleaning.

A filter device according to the present invention is a filter device for filtering a contaminated fluid containing particles, which comprises a filter tank into which the contaminated fluid is introduced, a magnetic ball filter medium which is formed of an aggregate of a large number of spherical metal balls of a magnetic material and is held in the filter tank in a manner such that the metal balls are movable relatively to one another, magnets relatively movable with respect to the magnetic ball filter medium between a first position and a second position and configured to apply a magnetic field to the metal balls, thereby causing the metal balls magnetically to attract one another and be fixed to one another, when in the first position and to cancel the magnetic attraction between the metal balls when in the second position, and holding means for relatively moving the magnets between the first position and the second position.

When a magnetic field is applied to the magnetic ball filter medium, according to the present invention, the metal balls are fixed in contact with one another, and an inwardly tapered, narrow gap is defined to be pointed to a contact point between their respective spherical surfaces. Since particles can be caught by this gap and the like, the particles can be captured without regard to whether they are magnetic or non-magnetic. Since the metal balls with smooth surfaces are used as the magnetic ball filter medium, moreover, the particles having so far been caught on the surfaces of the metal balls can be easily caused to leave the metal balls by canceling the magnetic field to allow the metal balls to move relatively to one another during cleaning operation, so that the cleaning can be performed effectively.

Although the "balls" described herein are spherical cubic bodies in a geometric sense, ideally, they may well be subject to some dispersions in their diameter (spherical diameter) and roundness that are attributable to inevitable factors, such as errors in the manufacture of spheres. Preferably, for example, the metal balls are steel balls each having a surface finished smooth, the respective diameters of the steel balls being equal to one another. Alternatively, however, a plurality of types of steel balls having different diameters may be mixed with one another.

Preferably, the metal balls are held between partition members formed of corrugated mesh members. In this case, a pore diameter of the mesh members is smaller than the diameters of the steel balls. With this arrangement, pores in the mesh members can avoid being closed by the steel balls, so that an opening for the passage of a fluid never fails to be secured.

Preferably, the filter tank has a dirty chamber defined under the magnetic ball filter medium and a clean chamber defined over the magnetic ball filter medium. In this case, a cleaned fluid in the clean chamber is caused to fall into the dirty chamber through the magnetic ball filter medium as the magnetic ball filter medium is cleaned. Particles having so far been caught in gaps between the metal balls are washed away with this fluid and delivered to a sludge disposal unit or the like. By doing this, the magnetic ball filter medium can be easily cleaned as required by utilizing the cleaned fluid in the filter tank, whereby the filtering capacity can be recovered. In this case, the filter device can be used directly for the cleaning, so that the running cost is low.

DETAILED DESCRIPTION OF THE INVENTION

An embodiment of the present invention will now be described with reference to FIGS. 1 to 9.

Figure 1:
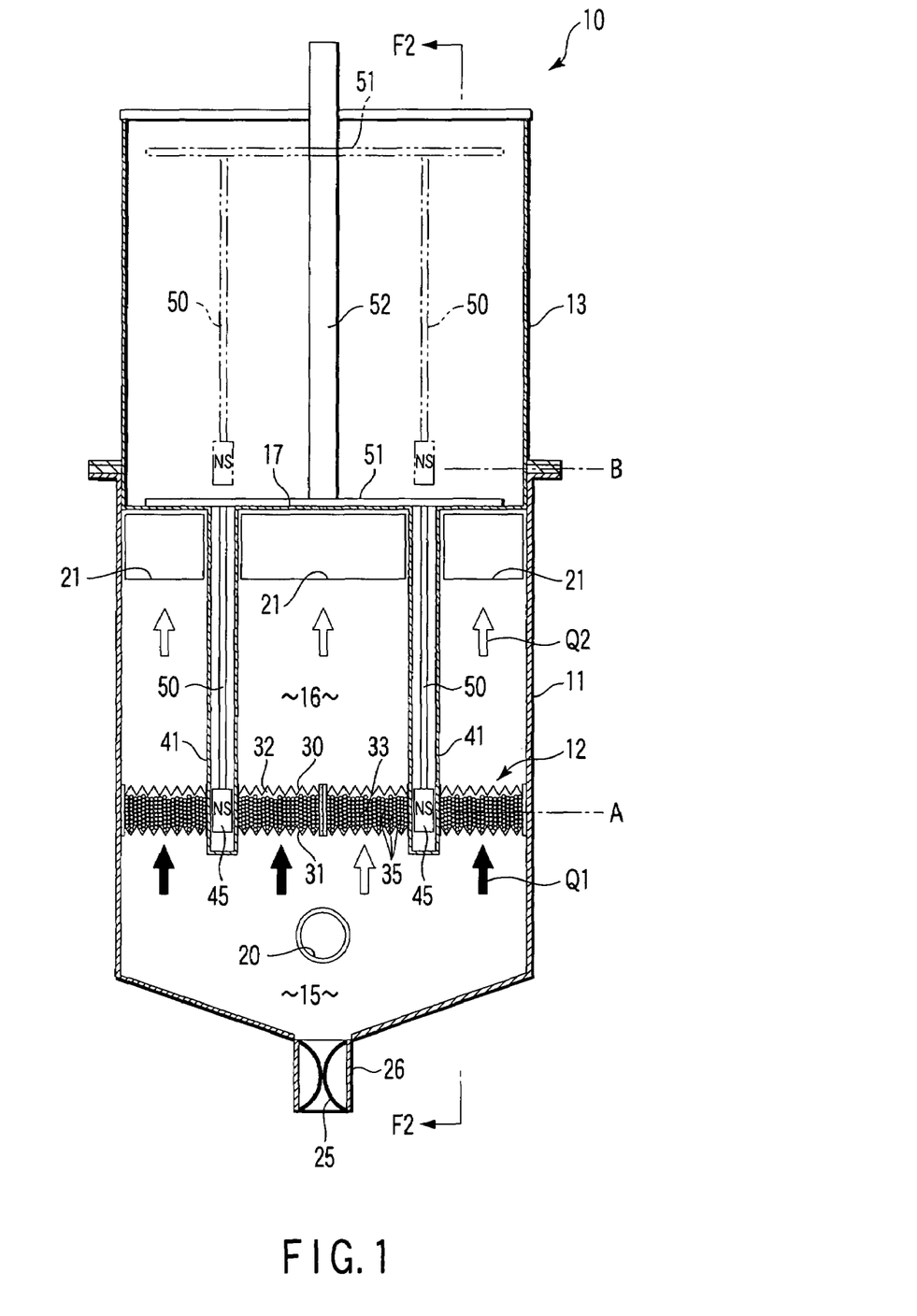
FIG. 1 is a longitudinal sectional view of a filter device according to an embodiment of the present invention.
Figure 2:
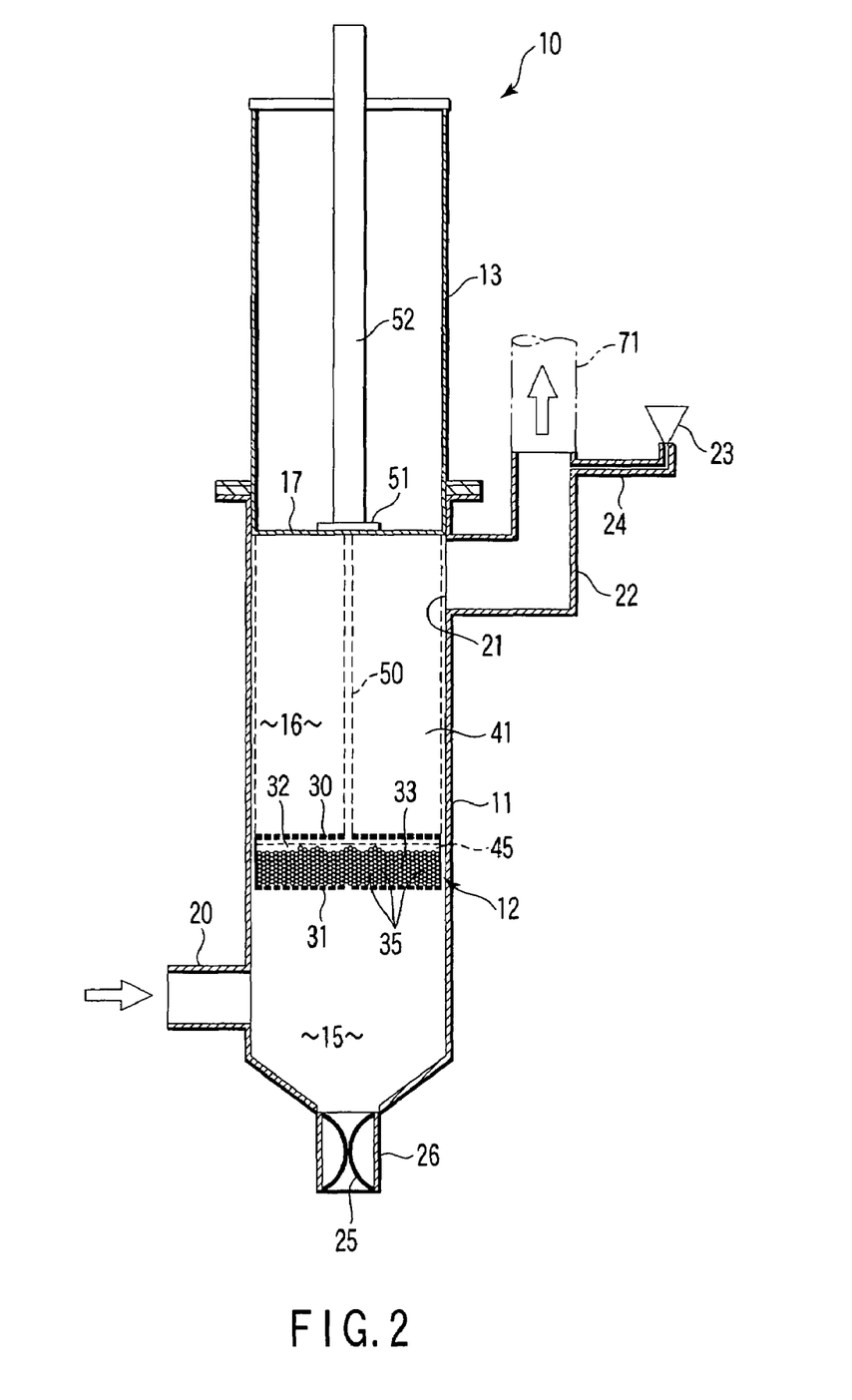
FIG. 2 is a longitudinal sectional view of the filter device taken along line F2-F2 of FIG. 1.

A filter device 10 shown in FIGS. 1 and 2 comprises a filter tank 11 and a filter medium unit 12. The material of the filter tank 11 is a magnetic material such as an iron-based metal. A cover housing 13 is provided at the top part of the filter tank 11. Defined in the filter tank 11 are a dirty chamber 15 situated under the filter medium unit 12 and a clean chamber 16 situated over the filter medium unit 12. The upper part of the clean chamber 16 is hermetically closed by a partition wall 17.

A contaminated fluid inlet 20 that opens into the dirty chamber 15 is formed in the lower part of the filter tank 11. A contaminated fluid that contains particles to be filtered is introduced into the dirty chamber 15 through the contaminated fluid inlet 20. A clean fluid outlet 21 that opens into the clean chamber 16 is formed in the upper part of the filter tank 11.

As shown in FIG. 2, a clean fluid pipe 22 is connected to the clean fluid outlet 21. The clean fluid pipe 22 is connected with an air supply pipe 24 that is provided with an air valve 23 for use as atmospheric pressure releasing means. The clean chamber 16 can be opened to the atmosphere by opening the air valve 23. Alternatively, the air supply pipe 24 may be connected with a source of compressed air supply. In this case, compressed air can be fed into the clean chamber 16. A drain port 26 with a drain valve 25 is provided at the bottom portion of the filter tank 11.

The filter medium unit 12 is constructed in the following manner.

Figure 3:
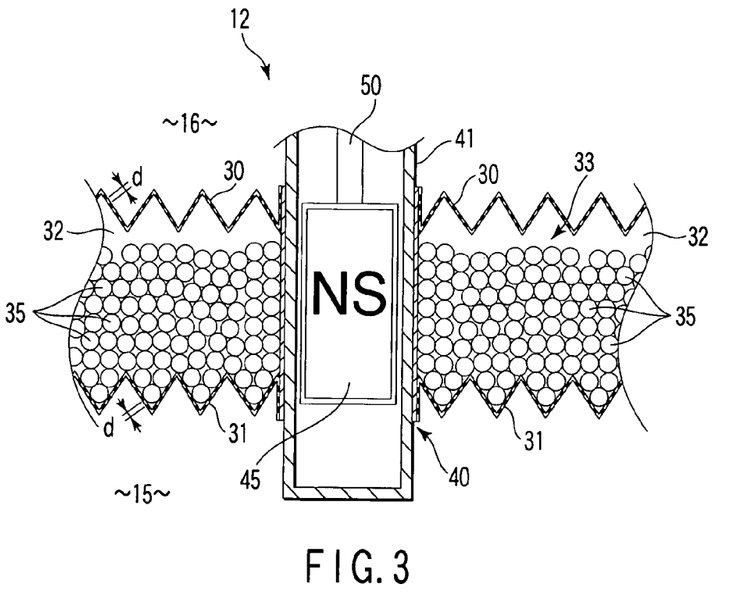
FIG. 3 is an enlarged sectional view showing a part of a filter medium unit of the filter device shown in FIG. 1.

FIG. 3 is an enlarged sectional view showing a part of the filter medium unit 12. The filter medium unit 12 is provided with partition members 30 and 31 formed of corrugated mesh members (punching metals), a filter medium storage portion 32 or a case surrounded by the partition members 30 and 31, and a magnetic ball filter medium 33 contained in the filter medium storage portion 32.

A pore diameter $d$ (shown in FIG. 3) of the mesh members as the material of the partition members 30 and 31 is smaller than the diameter of metal balls 35, which will be mentioned later. If the diameter of the metal balls 35 is 2.2 or 2.8 mm, for example, the pore diameter $d$ of the mesh members is 1.5 mm.

Thus, pores in the mesh members can avoid being closed by the metal balls 35, so that an opening for the passage of a fluid never fails to be secured.

The magnetic ball filter medium 33 is an aggregate of a large number of metal balls 35 of a magnetic material (e.g., steel balls). These metal balls 35 are held in the filter medium storage portion 32 so that they can move relatively to one another in a free state without application of any magnetic field. Specifically, the metal balls 35 are housed with an allowance such that there are some gaps between the upper partition member 30 and the metal balls 35. These metal balls 35 are steel balls of which the surfaces are finished smooth.

The metal balls 35 have an external appearance similar to that of rolling bodies (balls) of a ball bearing. The metal balls 35 can be satisfactorily used even though their surface roughness and diameter dispersion are not so high in accuracy as those of a ball bearing. The respective diameters of all the metal balls 35 that are contained in the filter medium storage portion 32 are equal. In some cases, however, it is to be desired that a plurality of types of steel balls with different diameters should be mixedly used.

The filter medium unit 12 is formed with a magnet storage portion 40. Magnet guides 41 in the form of bottomed containers are inserted in the magnet storage portion 40. The magnet guides 41 extend from the magnet storage portion 40 to the vicinity of the top part of the filter tank 11.

The magnet guides 41 contain magnets 45. An example of each magnet 45 is a strong permanent magnet. The magnets 45 can relatively move in the vertical direction along the magnet guides 41. They are movable with respect to the magnetic ball filter medium 33 between a first position A on the lower side indicated by solid line in FIG. 1 and a second position B on the upper side indicated by two-dot chain line in FIG. 1. When the magnets 45 are situated in the first position A with respect to the magnetic ball filter medium 33, they apply a magnetic field to the metal balls 35, thereby causing the metal balls 35 magnetically to attract one another and be fixed. If the magnets 45 are moved to the second position B, moreover, the magnetic attraction between the metal balls 35 is canceled, whereupon the metal balls 35 are allowed to move.

Holding means for relatively moving the magnets 45 between the first position A and the second position B comprises lift rods 50 attached individually to the magnets 45, a horizontal connecting member 51 that connects the respective upper end portions of the lift rods 50, an upwardly extending operating member 52 fixed to the connecting member 51, etc. The operating member 52 is configured to be driven in the vertical direction by manual operation or by means of an actuator (not shown) so that it can move the magnets 45 between the first position A and the second position B.

Figure 4:
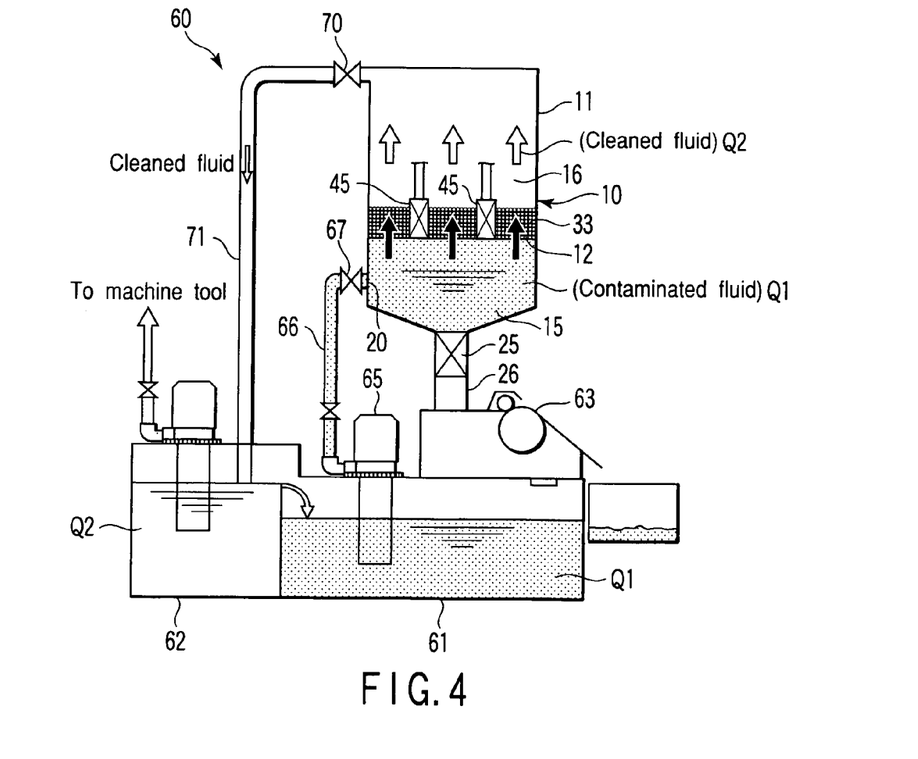
FIG. 4 is a sectional view typically showing a state during filtering operation of a filter equipment provided with the filter device shown in FIG. 1.
Figure 6:
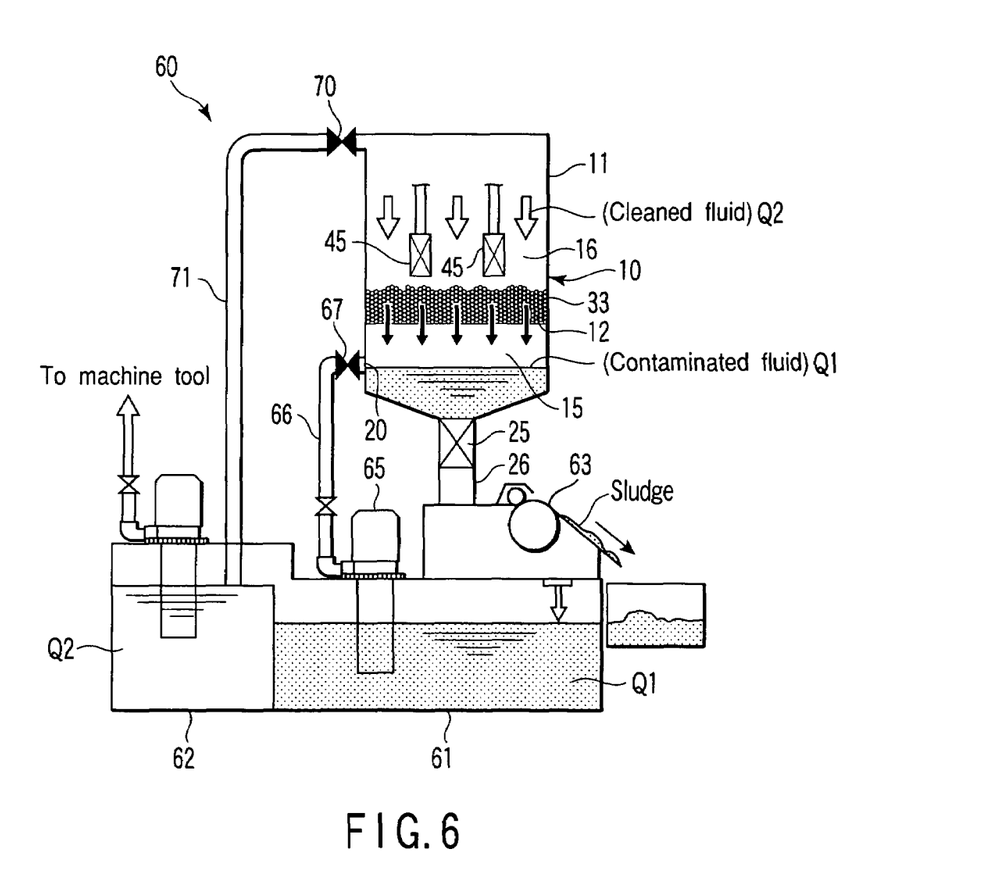
FIG. 6 is a sectional view typically showing a state during cleaning operation of the filter equipment provided with the filter device shown in FIG. 1.

FIGS. 4 and 6 show an outline of a filter equipment 60 that has the filter device 10. The filter equipment 60 comprises a dirty tank 61, a clean tank 62, the filter device 10, a sludge disposal unit 63, etc. As shown in FIG. 4, a contaminated fluid Q1 that contains particles to be filtered is fed to the contaminated fluid inlet 20 of the filter device 10 through a pump 65, a pipe 66, and a valve 67. A cleaned fluid Q2 in the clean chamber 16 of the filter device 10 is withdrawn into the clean tank 62 through a valve 70 and a pipe 71.

In a filtering process for filtering the contaminated fluid Q1, as shown in FIG. 4, the valves 67 and 70 are opened, and the drain valve 25 is closed. Then, the contaminated fluid Q1 in the dirty tank 61 is supplied to the dirty chamber 15 of the filter device 10 by the pump 65. Further, a magnetic field is applied to the magnetic ball filter medium 33 by moving the magnets 45 of the filter medium unit 12 to the first position A (shown in FIG. 1).

Figure 5:
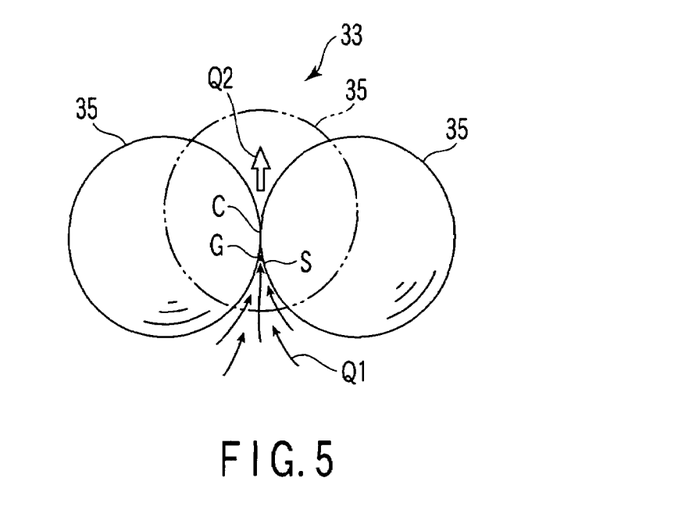
FIG. 5 is a side view showing a behavior during filtering operation of a magnetic ball filter medium of the filter device shown in FIG. 1.

Since this magnetic field fixes the metal balls 35 in contact with one another, as shown in FIG. 5, an inwardly tapered, narrow wedge-shaped gap G is defined to be pointed to a contact point C between the respective spherical surfaces of the metal balls 35. As the contaminated fluid Q1 flows near the contact point C between the metal balls 35, particles S get into the depth of the gap G and the like, whereupon the particles S are captured. Thus, the particles S can be captured without regard to whether they are magnetic or non-magnetic. If the particles S are magnetic, the particles S can be attached to the surfaces of the metal balls 35 that are magnetized by the magnets 45.

If the amount of the particles S captured by the magnetic ball filter medium 33 is increased, the filter performance lowers. A cleaning process is performed in order to recover the filter performance. In the cleaning process, the valves 67 and 70 are closed, as shown in FIG. 6, and the air valve 23 (shown in FIG. 2) is opened, whereupon the interior of the clean chamber 16 is opened to the atmosphere. Further, the pump 65 is stopped to open the drain valve 25. The magnets 45 of the filter medium unit 12 are moved to the second position B (shown in FIG. 1). Thereupon, the magnetic field having so far been applied to the magnetic ball filter medium 33 in the filtering process is canceled, so that the metal balls 35 are allowed to move relatively to one another, as exaggeratedly shown in FIG. 7.

As a result, the cleaned fluid Q2 in the clean chamber 16 is dropped toward the dirty chamber 15 through the filter medium unit 12 by its own weight. When this is done, the cleaned fluid Q2 in the clean chamber 16 may be quickly forced out toward the dirty chamber 15 under air pressure by supplying compressed air from the air supply pipe 24 (shown in FIG. 2) to the clean chamber 16.

Figure 7:
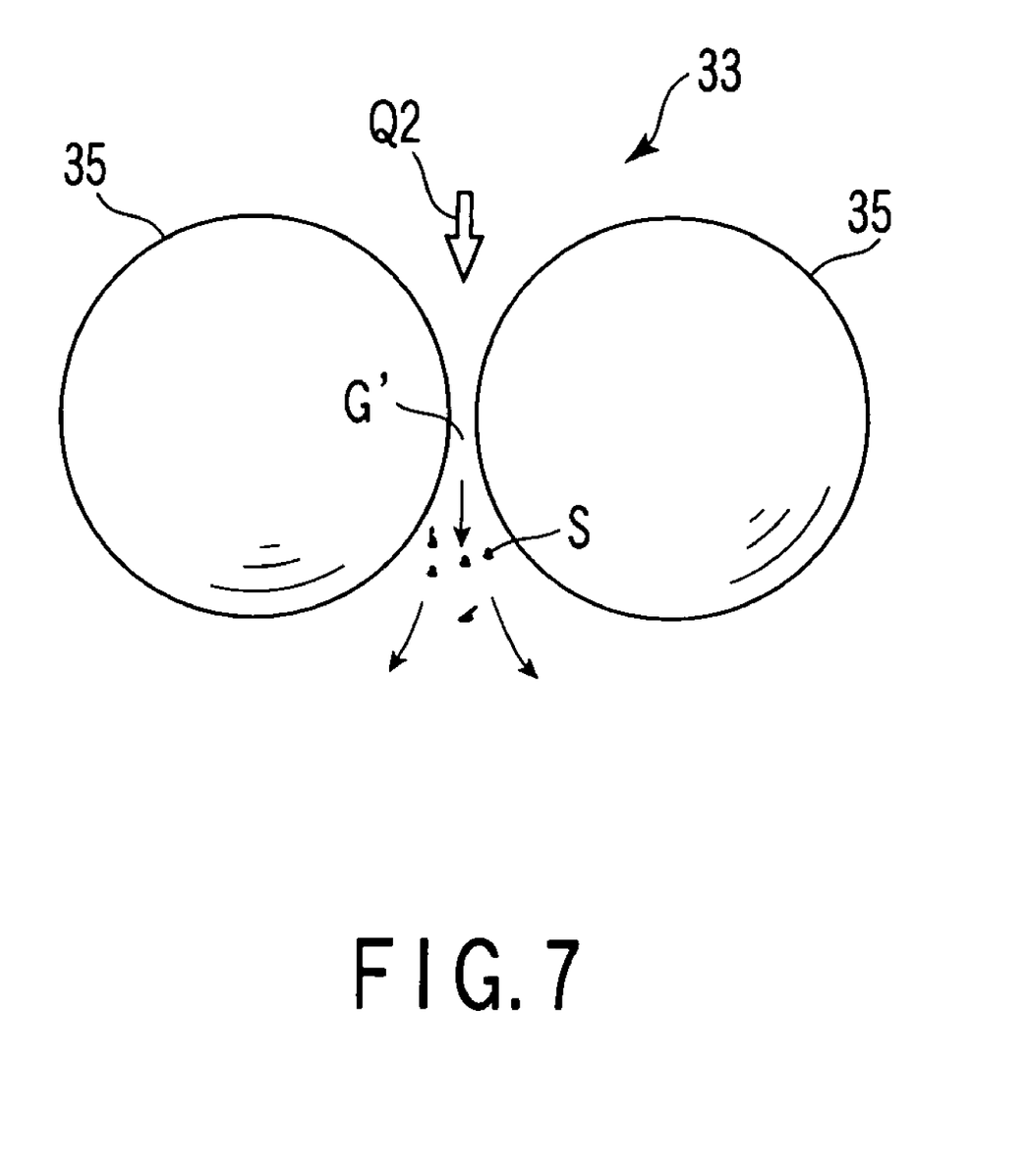
FIG. 7 is a side view showing a behavior during cleaning operation of the magnetic ball filter medium of the filter device shown in FIG. 1.

As the cleaned fluid Q2 flows from the clean chamber 16 toward the dirty chamber 15, the surfaces of the metal balls 35 are cleaned off with the cleaned fluid Q2. Specifically, a gap G' between the spherical surfaces widens, as shown in FIG. 7. Accordingly, the particles S having so far been caught between the metal balls 35 can leave the smooth surfaces of the metal balls 35, so that cleaning can be carried out easily and effectively. A sludge that contains a large quantity of particles and the like is discharged through the drain port 26 into the sludge disposal unit 63 is separated from the fluid and recovered by the sludge disposal unit 63.

According to the filter device 10 of the present embodiment, as described above, the magnetic ball filter medium 33 can be cleaned easily and quickly by utilizing the cleaned fluid Q2 in the filter tank 11 as required if the filtering capacity is reduced, so that the filtering capacity can be recovered in a short time. Since the filter device 10 itself can be used directly for the cleaning, moreover, the running cost is low.

Figure 8:
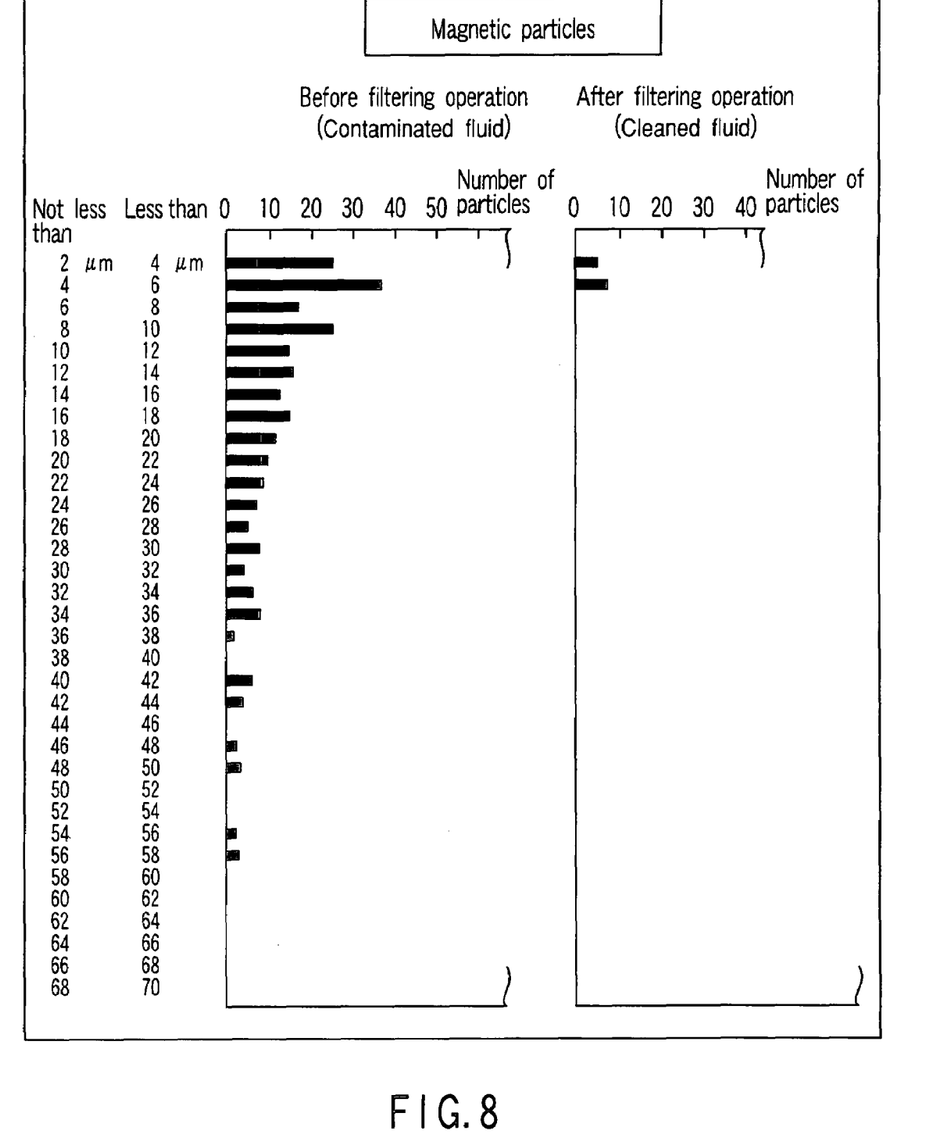
FIG. 8 is a diagram showing the numbers of particles in contaminated fluids containing magnetic particles obtained before and after filtering operation.

FIG. 8 shows results of observation of the numbers of particles in sample fluids performed with an optical microscope before and after the fluids were actually filtered by the filter device 10. The sample fluids were oil-base coolants in which magnetic particles (FCD chips) were mixed and which flowed at a rate of 30 liters/min.

A large number of magnetic particles with equivalent circle diameters of 2.6 to 56.8 µm were observed in unfiltered contaminated fluids. However, only few magnetic particles of 2.6 to 5.8 µm were observed in filtered cleaned fluids. Thus, it was confirmed that relatively large particles and ultra-fine particles with diameters up to approximately 10 µm were able to be removed satisfactorily. In this example, the removal rate of particles (chip removal rate) was 98.7% with the SS concentrations (mg/liter) of the contaminated fluids and the cleaned fluids at 299 and 4 ppm, respectively.

Figure 9:
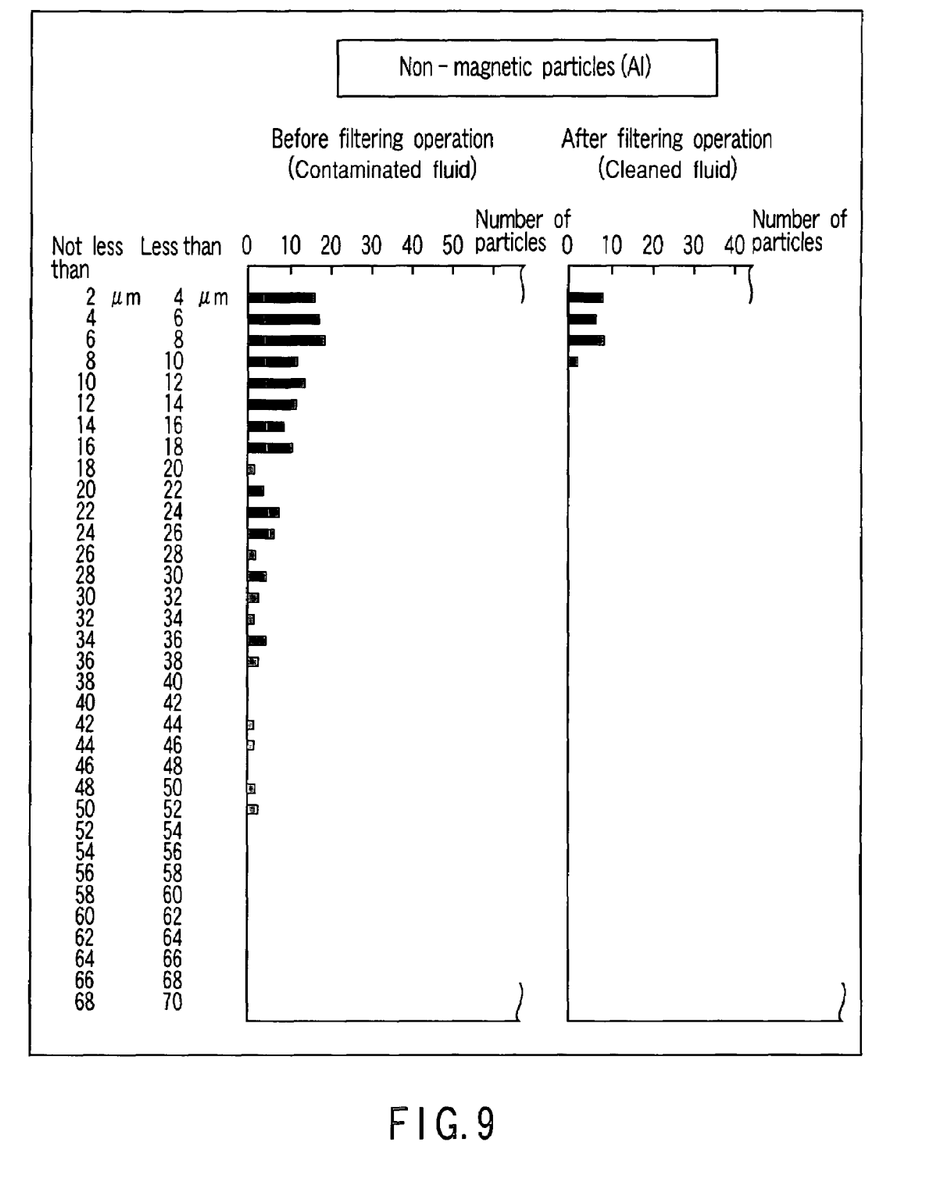
FIG. 9 is a diagram showing the numbers of particles in contaminated fluids containing non-magnetic particles obtained before and after filtering operation.

FIG. 9 shows results of observation of the numbers of particles in water-soluble sample fluids, which contain particles of a non-magnetic material (aluminum), performed with the optical microscope when the fluids were filtered by the filter device 10. The flow rate was 20 liters/min. A large number of particles of 2.6 µm to 50.9 µm were observed in unfiltered contaminated fluids. However, only few non-magnetic particles of 2.6 µm to 9.8 µm were observed in filtered cleaned fluids. Thus, it was confirmed that relatively large particles and ultra-fine particles with diameters up to approximately 10 µm were also able to be removed satisfactorily. In this example, the particulate removal rate was 98.4% with the SS concentrations of the contaminated fluids and the cleaned fluids at 123 ppm and 2 ppm, respectively.

In carrying out the present invention, it is to be understood that the components of the invention, including the filter tank, metal balls of the magnetic ball filter medium, magnets, holding means, etc., may be embodied in suitably modified forms without departing from the spirit of the invention.

What is claimed is:

1. A filter device for filtering a contaminated fluid containing particles, the filter device comprising:
    a filter tank into which the contaminated fluid is introduced;
    a magnetic ball filter medium which is formed of an aggregate of a large number of spherical metal balls of a magnetic material and is held in the filter tank in a manner such that the metal balls are movable relatively to one another;
    magnets relatively movable with respect to the magnetic ball filter medium between a first position and a second position and configured to apply a magnetic field to the metal balls, thereby causing the metal balls magnetically to attract one another and be fixed to one another, when in the first position and to cancel the magnetic attraction between the metal balls when in the second position; and
    holding means for relatively moving the magnets between the first position and the second position; wherein
    the filter tank has a dirty chamber which is defined under the magnetic ball filter medium and into which the contaminated fluid is introduced, a clean chamber which is defined over the magnetic ball filter medium and contains a cleaned fluid filtered through the magnetic ball filter medium, and a sludge disposal unit which is defined under the dirty chamber, and wherein
    when the magnetic ball filter medium is cleaned, the magnets are moved to the second position so that the metal balls are moveable relative to one another, and by causing the cleaned fluid in the clean chamber to fall into the sludge disposal unit through the magnetic ball filter medium and the dirty chamber, particles adhering to the metal balls are washed away.

2. A filter device according to claim 1, wherein the metal balls which constitute the magnetic ball filter medium are steel balls each having a smooth surface, the respective diameters of the steel balls being equal to one another.

3. A filter device according to claim 2, wherein the metal balls are held in a filter medium storage portion surrounded by partition members formed of corrugated mesh members, the mesh members having a pore diameter smaller than the diameters of the steel balls.

4. A filter device according to claim 1, wherein the metal balls which constitute the magnetic ball filter medium are steel balls each having a smooth surface, the steel balls being of a plurality of types having different diameters and mixed with one another.

5. A filter device according to claim 4, wherein the metal balls are held in a filter medium storage portion surrounded by partition members formed of corrugated mesh members, the mesh members having a pore diameter smaller than the diameters of the steel balls.

* * * * *